(12) United States Patent  
Pahl et al.

(10) Patent No.: US 7,716,773 B1
(45) Date of Patent: May 18, 2010

(54) DEBRIS SWEEPER FOR TURF SURFACE

(75) Inventors: Gaylord M. Pahl, Excelsior, MN (US); Jack R. Gust, Northfield, MN (US); Miguel A. Pizano, Eden Prairie, MN (US); Dennis J. Deets, Medford, MN (US)

(73) Assignee: The Toro Company, Bloomington, MN (US)

( * ) Notice: Subject to any disclaimer, the term of this patent is extended or adjusted under 35 U.S.C. 154(b) by 1157 days.

(21) Appl. No.: 11/191,778

(22) Filed: Jul. 28, 2005

(51) Int. Cl.
*E01H 1/04* (2006.01)

(52) U.S. Cl. ............................ 15/83; 15/82; 56/344
(58) Field of Classification Search ............ 15/78, 15/82–86; 56/202, 320.2, 344
See application file for complete search history.

(56) References Cited

U.S. PATENT DOCUMENTS

| | | | | |
|---|---|---|---|---|
| 2,278,306 A | * | 3/1942 | Cushman et al. | 15/82 |
| 2,330,025 A | * | 9/1943 | Bentley et al. | 15/82 |
| 3,712,039 A | * | 1/1973 | Avis | 56/328.1 |
| 4,550,465 A | * | 11/1985 | Chrisley | 15/84 |
| 4,593,426 A | * | 6/1986 | Chrisley | 15/84 |
| 4,608,725 A | * | 9/1986 | Jackson | 15/3 |
| 4,796,322 A | * | 1/1989 | Steed et al. | 15/79.2 |
| 4,914,774 A | * | 4/1990 | Sheehan et al. | 15/5 |
| 5,329,661 A | * | 7/1994 | Smith | 15/80 |
| 5,390,387 A | * | 2/1995 | Dube et al. | 15/79.2 |
| 5,742,968 A | * | 4/1998 | Nicholson | 15/83 |
| 5,784,756 A | * | 7/1998 | Slocum et al. | 15/348 |
| 2004/0060139 A1 | * | 4/2004 | Peters | 15/83 |

OTHER PUBLICATIONS

John Deere TC125 Turf Collection System Parts Catalog, Jun. 1999.
John Deere TC-125 Turf Collection System Photo (Jun. 7, 1999) and Brochure (1996-2005).

* cited by examiner

*Primary Examiner*—Mark Spisich
(74) *Attorney, Agent, or Firm*—James W. Miller

(57) ABSTRACT

A debris sweeper has a powered rotary brush for sweeping debris, such as aerator cores, from a turf surface into a debris collecting hopper. The brush and hopper are carried on a wheeled tow frame. The hopper is pivotally supported on a pivotal lift frame that moves the hopper between a lower, debris collecting position and an upper, debris dumping position. The lift frame pivots on the tow frame behind an axis of a pair of wheels while the hopper pivots on the lift frame in front of the wheel axis. This ensures that positive weight is kept on the tongue of the tow frame at all times.

17 Claims, 12 Drawing Sheets

DEBRIS SWEEPER FOR TURF SURFACE

TECHNICAL FIELD

This invention relates to a debris sweeper for picking up and removing debris, such as aeration cores, from a turf surface and for subsequently dumping and disposing of such debris.

BACKGROUND OF THE INVENTION

The appearance of large turf surfaces is increasingly important to the owners of property having such surfaces. It is often very important to someone who owns a golf course that the fairways and greens be well maintained and present a beautiful, well groomed appearance. However, this desire is not unique to the golf course industry. It is shared by the owners of commercial buildings, cemeteries, sports fields, parks, and the like, many of which have large turf surfaces that must be maintained.

In addition, many such turf surfaces are increasingly landscaped with trees, brushes or flower beds running through them or extending along their periphery. Many golf courses today aspire to have a picture postcard look. This involves fairways that are often extensively lined with trees, bushes and other plantings. The grounds adjacent commercial buildings are now usually heavily landscaped with flowers, bushes and trees.

Another trend in this industry is increasing attention to the health and growth of the turf surface itself. It has long been known that grass will grow more quickly and be healthier if the turf surface is periodically aerated. Core aeration is a common form of aeration and involves punching hollow aerating tines into the turf surface. Each aerating tine withdraws a soil core topped by a thatch of grass with the aeration cores usually simply being deposited on top of the turf surface as the aerator passes over the turf surface.

The desire for a well groomed, manicured turf surface is at odds with heavily landscaped, aerated turf surfaces. Such turf surfaces often become quickly littered with vegetative debris, such as twigs, branches, leaves, seed pods, acorns, etc., that falls or is blown from the adjacent landscaping. This happens more or less continuously throughout the active growing season of the landscaping. In addition, the turf surface will also often be littered with aeration cores after the turf surface has been aerated.

Many sweepers have been designed for attempting to pick up and remove debris from a turf surface. Such sweepers are often small walk-behind units that have a front mounted brush that sweeps up and deposits the debris into some type of collection basket behind the brush. These sweepers often must be pushed by the operator over the turf surface. In addition, the collection basket must be periodically emptied of collected debris which is usually done by the operator by manually removing the basket, inverting the basket, and dumping the debris out of the basket. Some times these sweepers are simply brushes added to conventional bagging type lawn mowers.

It should be obvious that walk-behind sweepers of the type just described are not intended for picking up debris from large turf surfaces but are more for use in a homeowner's yard. It would take an inordinately long time or an inordinately large number of sweepers to clean debris from a large turf surface, such as the fairways on a golf course. The cost in equipment and manpower to perform such an operation would be prohibitive. In addition, it would be very physically strenuous work for the operators.

At least one sweeper has been designed and is currently being sold for picking up and removing debris from large turf surfaces. This sweeper includes a frame that is trailed or towed behind a vehicle such as a utility vehicle or tractor. The sweeper includes a powered rotary brush that sweeps debris from the turf surface into a collecting hopper. The collecting hopper is pivotally coupled to the frame to allow the collecting hopper to be pivoted from a lower collecting position to an upper dumping position for dumping the debris from the hopper.

While this trailed sweeper is certainly more efficient in picking up debris from a large turf surface than its walk behind brethren, it nonetheless presents certain problems of its own. For example, the collecting hopper is pivoted to the frame behind the transport wheels. Thus, as the collecting hopper fills with debris, particularly debris that is heavy such as aeration cores left over after aeration, the increasing weight of the collection hopper progressively lessens the weight or downforce on the hitch tongue of the tow frame. In fact, when the collecting hopper becomes heavy enough, the tongue weight will actually switch from positive to negative. This will bias the rear of the towing vehicle upwardly and thereby lessen the traction of the towing vehicle, at a time when the towing vehicle needs traction the most due to the increasing weight of the debris sweeper, to potentially cause the towing vehicle to come to a stop.

Another problem with this sweeper is the fact that the rotary pick up brush does not follow the ground in a side-to-side manner. Many large turf surfaces with which this sweeper is used are not flat. In fact, the trend is to highly contour such surfaces so that they roll and dip a fair amount. Thus, the pick up brush used in this trailed sweeper will sometimes be out of contact with the turf surface and will miss some of the debris lying on the turf surface.

SUMMARY OF THE INVENTION

One aspect of this invention relates to a debris sweeper for a turf surface. The debris sweeper comprises a tow frame having a pair of transport wheels that rotate about a transverse wheel axis of rotation. A lift frame is connected to the tow frame for pivoting about a transverse lift frame pivot axis such that the lift frame pivots between a lower, debris collecting position and an upper, debris dumping position. A hopper is provided for receiving and holding debris picked up from the turf surface in the lower, debris collecting position of the lift frame and for dumping debris therefrom in the upper, debris dumping position of the lift frame. The hopper is connected to the lift frame for pivoting about a transverse hopper pivot axis.

Another aspect of this invention relates to a debris sweeper for a turf surface. The debris sweeper comprises a wheeled tow frame. A hopper is connected to the tow frame for holding and dumping debris picked up from the turf surface. A motor powered sweeper is provided to sweep debris from the turf surface into the hopper. The sweeper is mounted to pivot relative to the tow frame about a longitudinal roll axis to allow the sweeper to follow side-to-side variations in ground contour.

Yet another aspect of this invention relates to a debris sweeper for a turf surface. The debris sweeper comprises a wheeled tow frame having a forwardly extending hitch tongue for connecting the tow frame in a trailed position to a tow vehicle. The hinge tongue is pivotally adjustable about a substantially vertical axis. A hopper is connected to the tow frame for holding and dumping debris picked up from the turf surface. A motor powered sweeper is provided to sweep debris from the turf surface into the hopper. A powered adjuster extends between the tow frame and the hitch tongue for selectively pivoting the hitch tongue about the vertical axis and for holding the hitch tongue in an adjusted position to allow the trailed position of the tow frame to be laterally adjusted relative to the tow vehicle.

Moreover, another aspect of this invention relates to a debris sweeper for a turf surface. The debris sweeper comprises a wheeled tow frame. A hopper is connected to the tow frame for holding and dumping debris picked up from the turf surface. A lift frame is pivotally connected to the tow frame and carries the hopper for lifting and lowering the hopper between a lower, debris collecting position and an upper, debris dumping position. The lift frame is pivoted on the tow frame by a powered actuator connected between the tow frame and the lift frame. A motor powered sweeper is provided for sweeping debris from the turf surface into the hopper. A control box is electronically coupled to the actuator and the motor and has switches for selectively actuating the actuator and the motor. The control box is separate from the tow frame to permit the control box to be placed adjacent an operator of the tow vehicle when the debris sweeper is in use to allow the operator to control the actuator and the motor from the operator's location in the tow vehicle.

BRIEF DESCRIPTION OF THE DRAWINGS

This invention will be described more completely in the following Detailed Description, when taken in conjunction with the following drawings, in which like reference numerals refer to like elements throughout.

DETAILED DESCRIPTION

Figure 1:
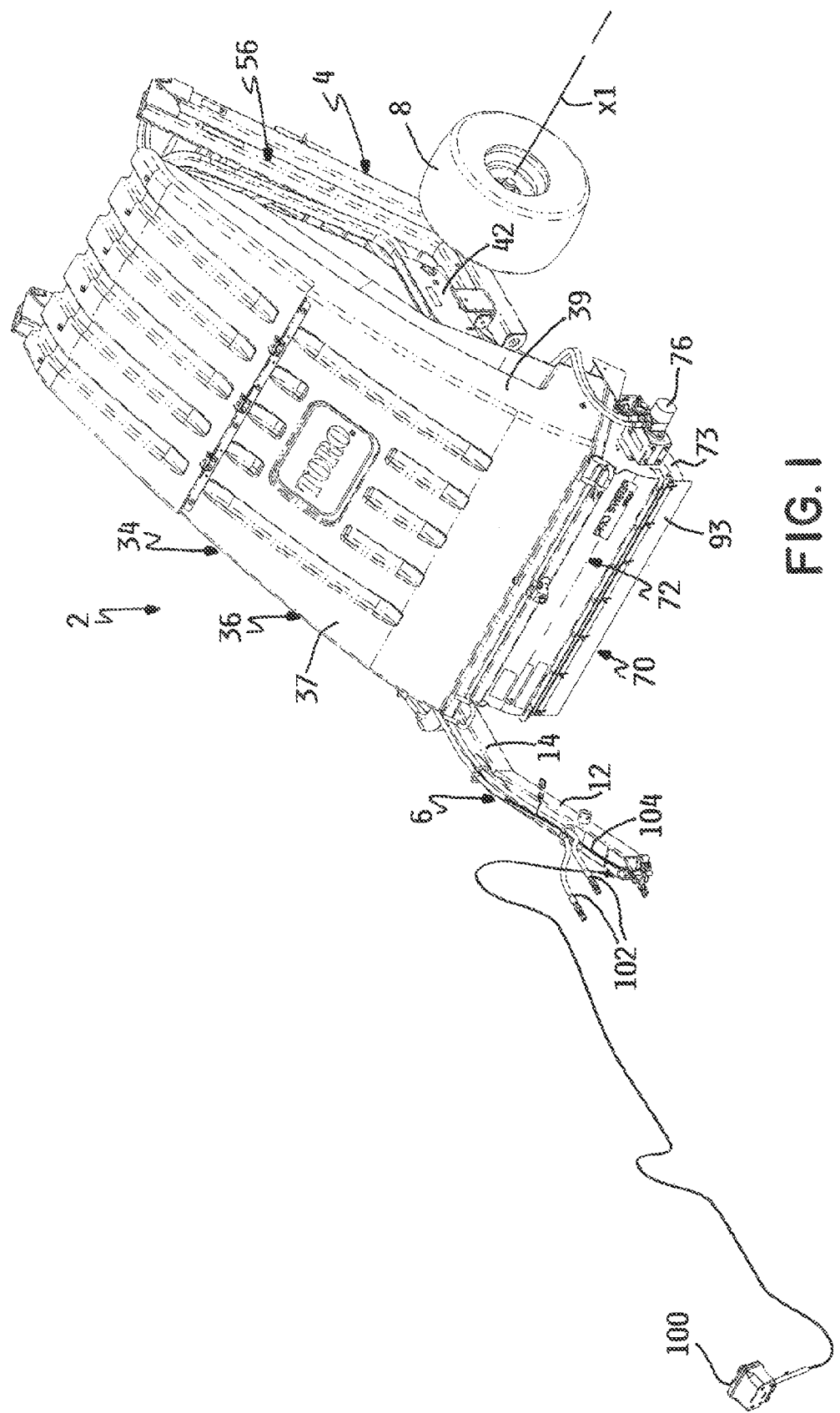
FIG. 1 is a perspective view of a debris sweeper according to this invention.

One embodiment of a sweeper according to this invention is illustrated generally as 2 in FIGS. 1-13. Sweeper 2 is particularly adapted for picking up and disposing of debris from a turf surface. Sweeper 2 can pick up and dispose of different types of debris. For example, sweeper 2 can pick up and dispose of vegetative debris, such as twigs, leaves, and the like, as well as manmade debris, such as aeration cores.

The Tow Frame

Sweeper 2 includes a tow frame 4 having a forwardly extending hitch tongue 6 and a pair of transport wheels 8 rotatably carried adjacent a rear of frame 4. Wheels 8 rotate on any suitable axle structure about a substantially horizontal, transverse axis of rotation $x_1$. Wheels 8 allow frame 4 to roll and to be pulled over the turf surface when tongue 6 is coupled to a suitable hitch on a tow vehicle (not shown). Frame 4 includes a pair of laterally spaced rear uprights 10 that extend rearwardly and upwardly from the rear of frame 4 such that the upper ends of uprights 10 are behind the rotational axis $x_1$ of wheels 8. See FIG. 2.

Tongue 6 is carried on one side of frame 4. Tongue 6 includes a front portion 12 and a rear portion 14 that are angled relative to one another. Rear tongue portion 14 pivots on a vertical pivot pin 16 carried between a pair of fixed ears 18 on one side of frame 4. See FIG. 10. Front tongue portion 12 includes a clevis hitch 19 for connecting tongue 6, and thus frame 4, to the rear end of a tow vehicle. Different hitches could be used in place of the clevis hitch shown herein. In addition, while a pivotal tongue 6 is disclosed herein, tongue 6 could simply be integrally mounted to frame 4.

The purpose of making tongue 6 pivotal on frame 4 is to selectively set tongue 6 in different orientations relative to frame 4 to change the trailed position of sweeper 2 relative to the tow vehicle. When sweeper 2 is in a transport mode where it is being towed from place to place, tongue 6 is held in the position shown in the drawings which allows sweeper 2 to trail directly behind the tow vehicle. However, when sweeper 2 is in an operational mode where sweeper 2 is picking up debris such as aeration cores from the turf surface, sweeper 2 is preferably offset to one side of the tow vehicle such that wheels 8 of the tow vehicle do not run over and crush the aeration cores before they reach sweeper 2. In the operational mode of sweeper 2, tongue 6 will be held in a different orientation in which front tongue portion 12 will extend generally straight back from the hitch on the tow vehicle such that rear tongue portion 14 will then be outwardly angled to the side.

Figure 10:
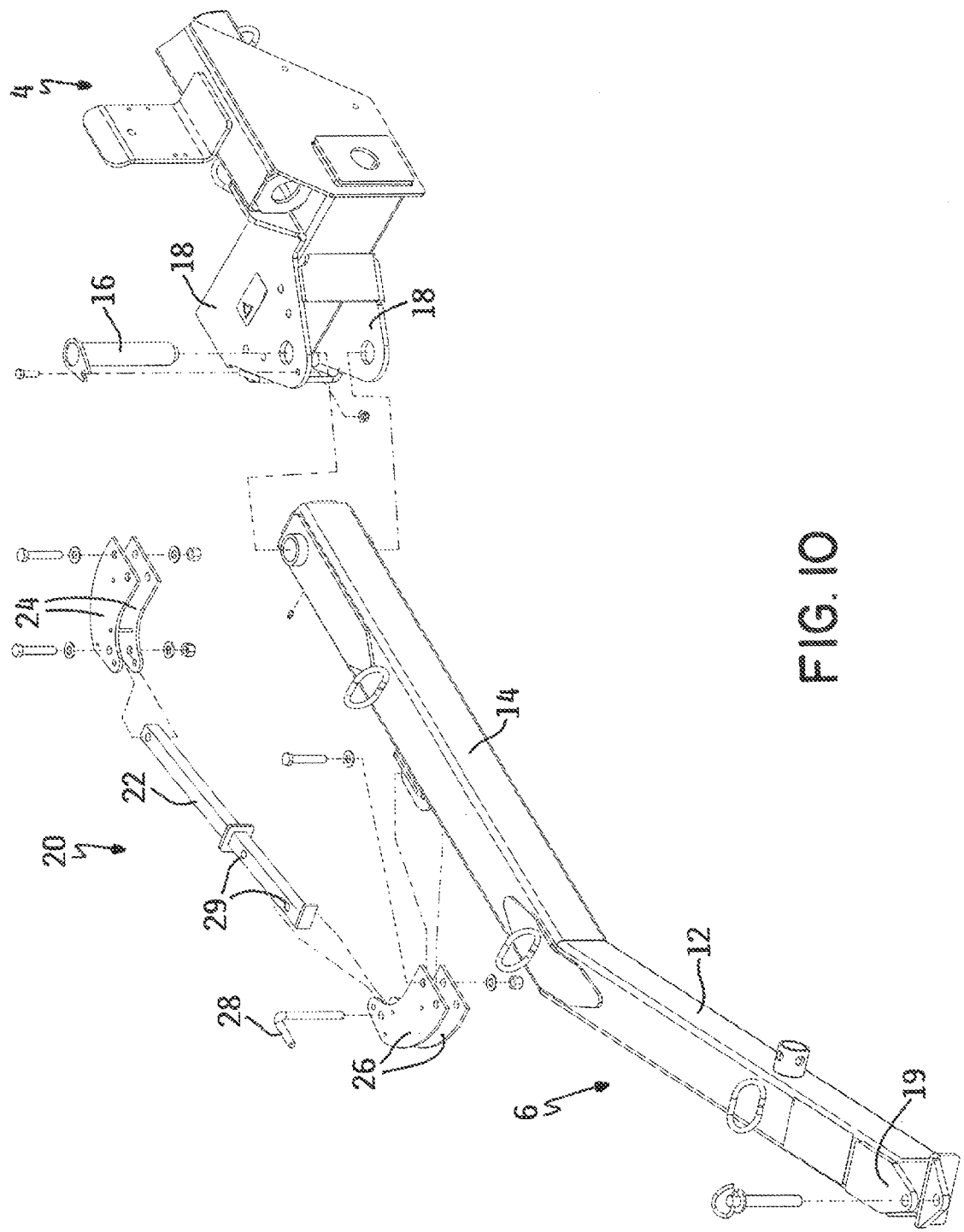
FIG. 10 is a perspective view of a portion of the debris sweeper of FIG. 1, particularly illustrating the hitch tongue and a manual adjuster for setting the hitch tongue in selected orientations relative to the frame of the debris sweeper.

FIG. 10 shows a manual adjuster 20 for holding tongue 6 in the transport and operational positions described above. Manual adjuster 20 comprises a forwardly extending adjuster arm 22 that is bolted to frame 4 by a pair of frame brackets 24. The front end of adjuster arm 22 extends between a pair of tongue brackets 26 that are bolted to one side of tongue 6. A lock pin 28 extends through tongue brackets 26 and through one of two different adjustment holes 29 provided on the front end of adjuster arm 22. When lock pin 28 passes down through the front adjustment hole 29 as shown in FIGS. 1 and 10, tongue 6 will be held in its transport position. When lock pin 28 passes down through the rear adjustment hole 29, tongue 6 will be held in its operational position (not shown in the drawings).

Figure 11:
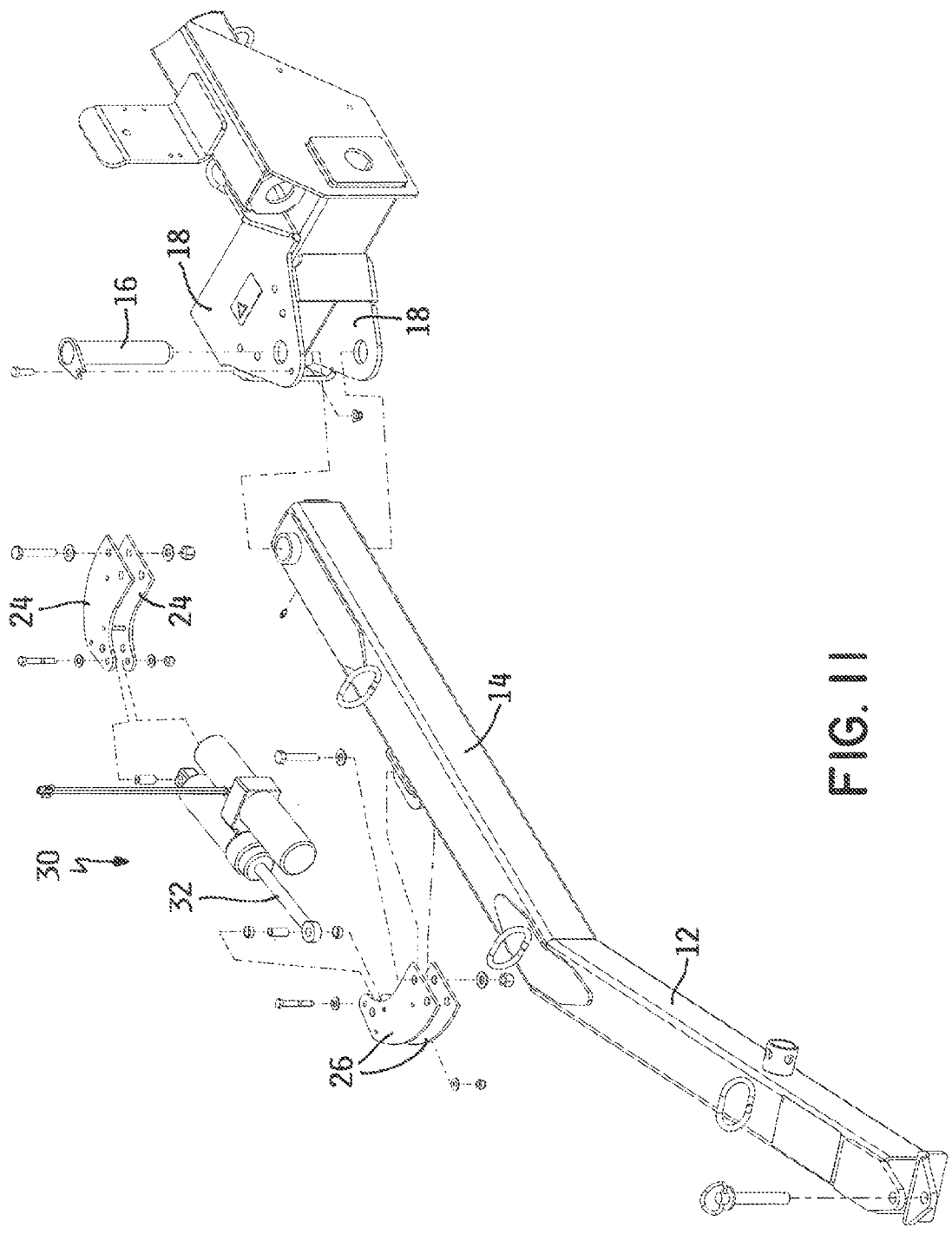
FIG. 11 is a perspective view similar to FIG. 10, but particularly illustrating a powered adjuster for setting the hitch tongue in selected orientations relative to the frame of the debris sweeper.

FIG. 11 shows a powered adjuster 30 that may be used in place of manual adjuster 20 shown in FIG. 10. In the powered adjuster, the adjuster arm comprises the piston arm 32 of a hydraulic cylinder or preferably of an electric actuator. Piston arm 32 is reciprocal between a maximum extended position shown in FIG. 11, which positions tongue 6 in the transport position as if one were using the front hole 29 in adjuster arm 22 of FIG. 10, and a minimum extended position, which positions tongue 6 in the operational position as if one were using the rear hole 29 in adjuster arm 22 of FIG. 10. Obviously, piston arm 32 could be stopped in a plurality of intermediate extended positions to provide a range of other offset positions of sweeper 2 in which the amount of the offset can be varied at will by the operator.

Powered adjuster 30 gives the operator the ability to vary the position of sweeper 2 behind the tow vehicle more easily than manual adjuster 20. For example, powered adjuster 30 can be operated without dismounting the tow vehicle, without having to manually disengage and reposition any parts, and even while frame 4 is being towed in an "on the fly" adjustment. Thus, the operator can easily and quickly move sweeper 2 from its offset, outboard operational position to its directly behind, inboard transport position to be able to drive the tow vehicle and sweeper 2 through a width restricted gate or along a narrow path. Then, after passing through the gate or along the path, the operator can just as easily and quickly move sweeper 2 back into its outboard operational position.

However, some operators might prefer manual adjuster 20 to minimize the cost of purchasing sweeper 2. Thus, a given operator could pick which type of adjuster he or she wishes to use on sweeper 2 in a trade off between price and convenience.

The Debris Collecting Hopper and Lift Frame

Sweeper 2 of this invention carries a debris collecting hopper 34 for holding a supply of whatever debris is being picked up and collected by sweeper 2. Hopper 34 comprises a rearwardly and upwardly extending hopper enclosure 36 having a top wall 37, a bottom wall 38, and spaced side walls 39 all fixed together to form enclosure 36. The front of hopper enclosure 36 is substantially open to form an entrance into hopper enclosure 36. This entrance cooperates with a brush head 70, to be described hereafter, for receiving debris that is picked up from the turf surface and thrown into hopper enclosure 36. The rear portion of top wall 37 of hopper enclosure 36 forms a pivotal exit door 40 that swings open in the direction of arrow A in FIG. 4 when debris is being dumped from hopper 34.

Figure 6:
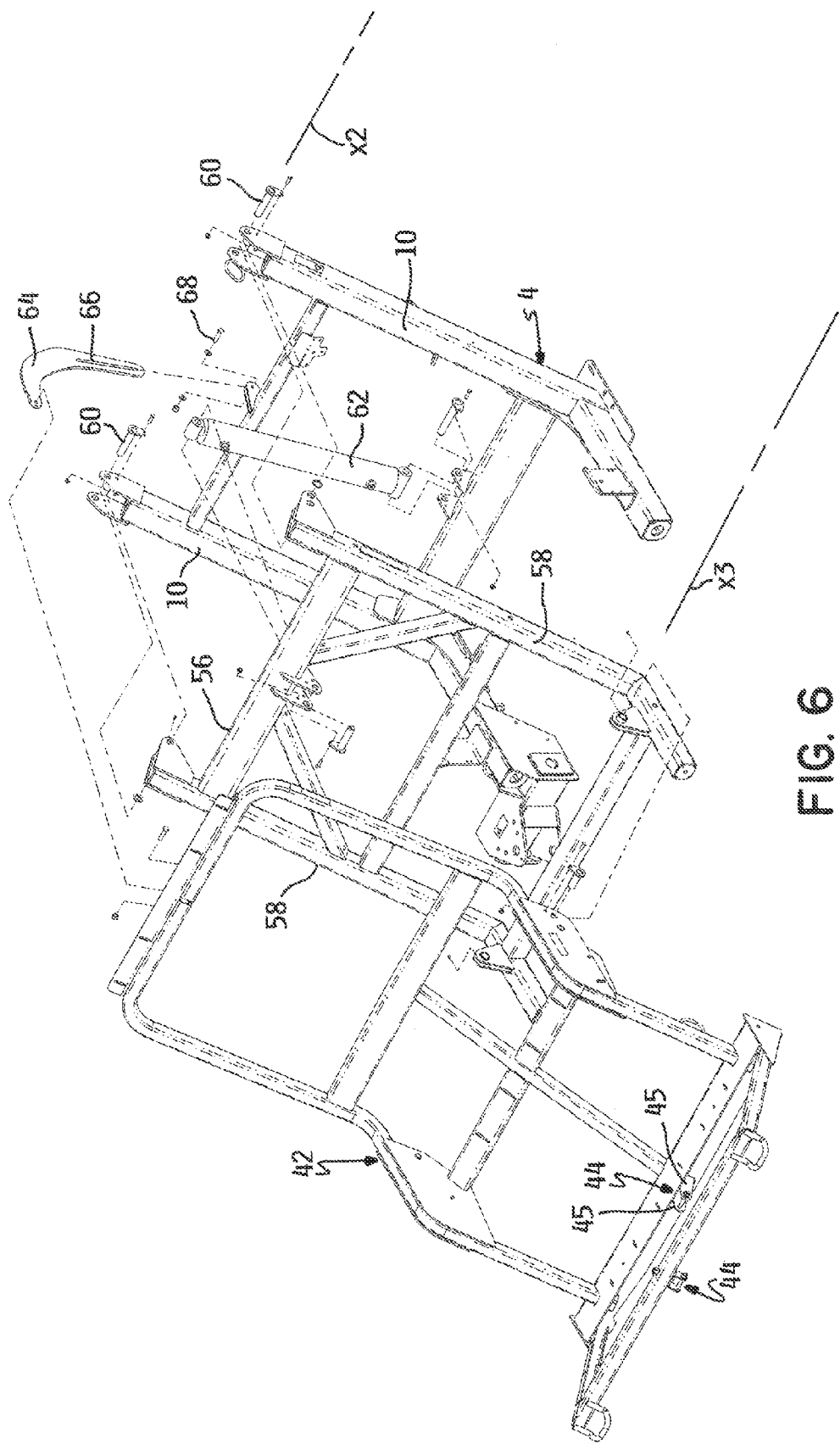
FIG. 6 is an exploded perspective view of various components of the debris sweeper of FIG. 1, particularly illustrating the tow frame, the lift frame, and the hopper frame and how these various frames connect together.
Figure 7:
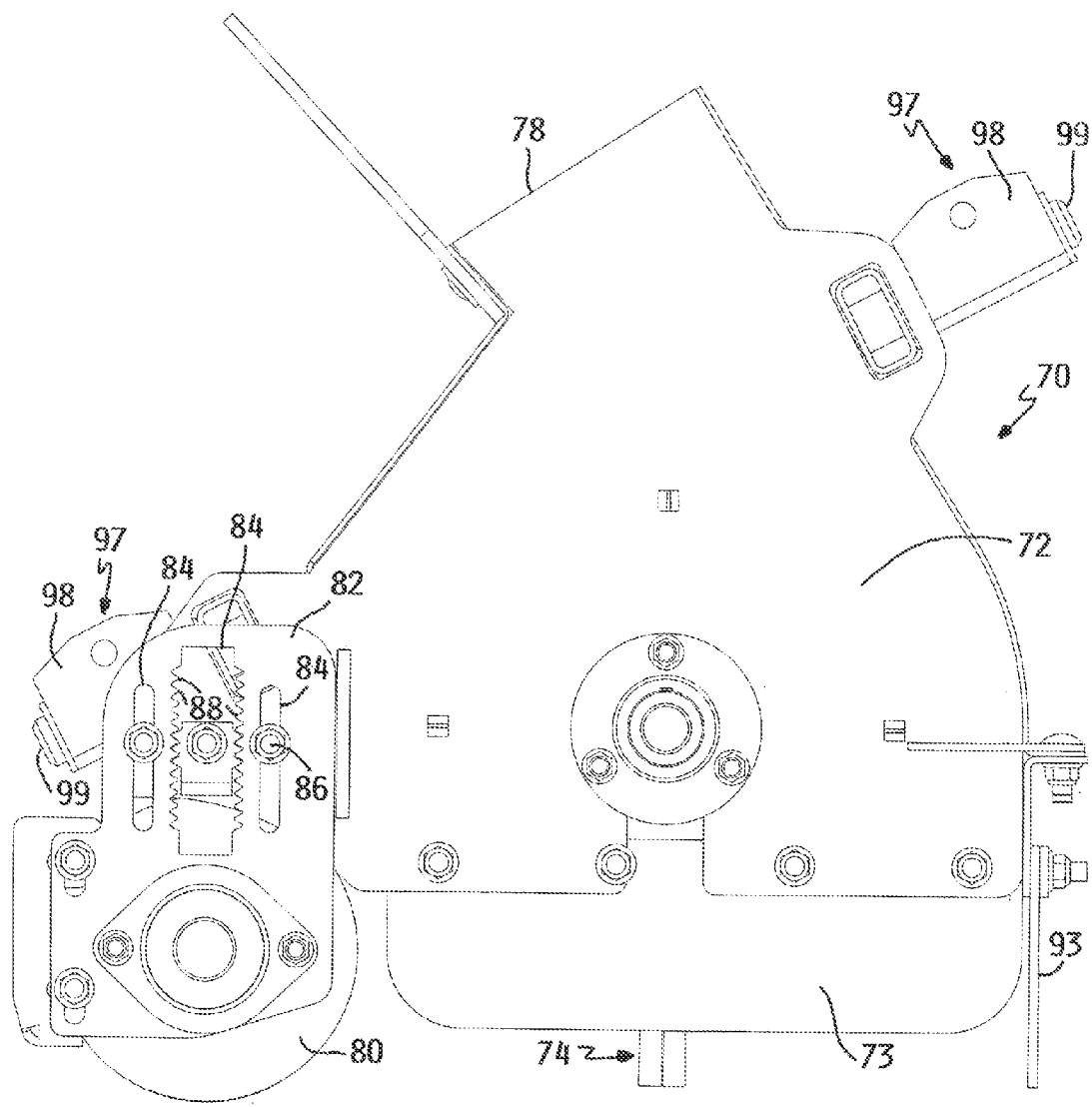
FIG. 7 is a side elevational view of the brush head of the debris sweeper of FIG. 1.
Figure 8:
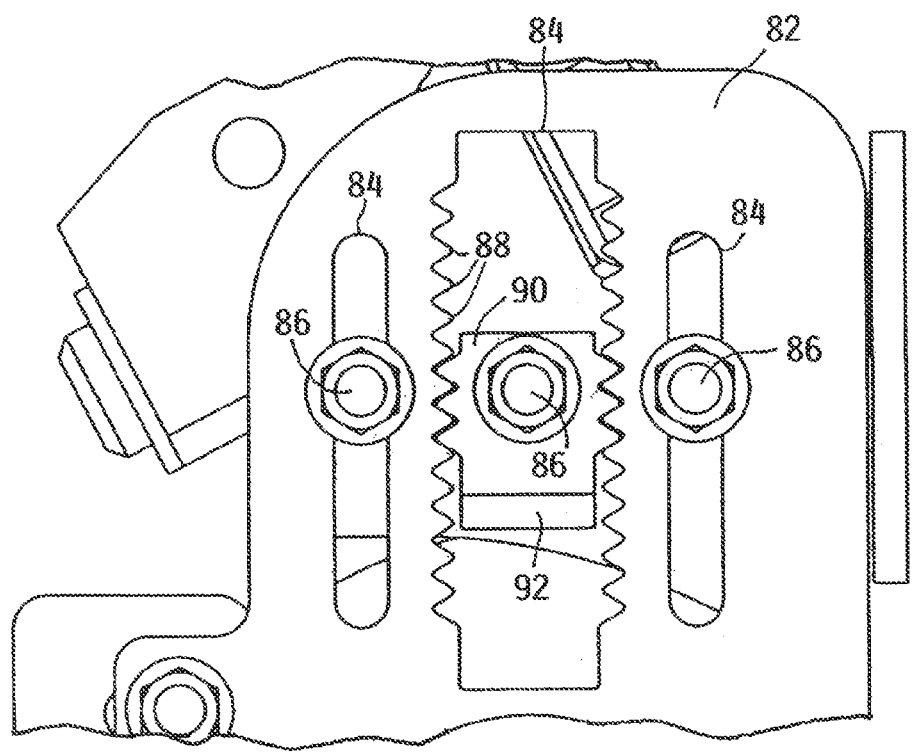
FIG. 8 is an enlarged side elevational view of a portion of the brush head shown in FIG. 7, particularly illustrating a height adjuster for raising and lowering the height of the brush head relative to the turf surface with a height adjustment key being shown with the tab down for providing a first set of incremental height adjustments.
Figure 9:
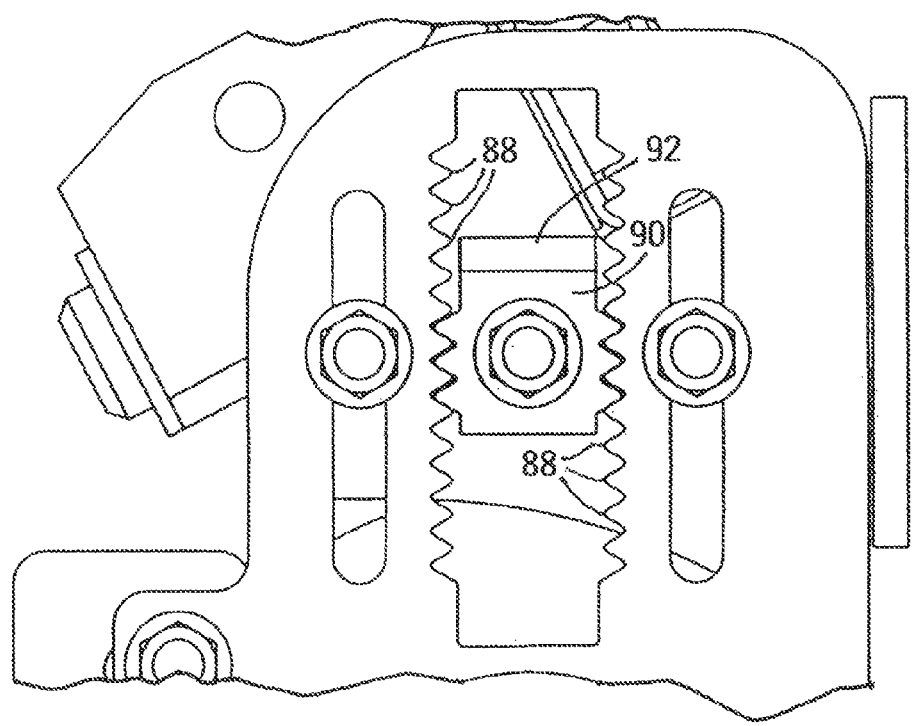
FIG. 9 is an enlarged side elevational view similar to FIG. 8, particularly illustrating the height adjustment key with the tab up for providing a second set of incremental height adjustments.

Hopper enclosure 36 is preferably formed of high strength, durable plastic material. Hopper enclosure 36 is then fixedly mounted in any suitable manner to a hopper frame 42 that comprises an additional part of hopper 34. Hopper frame 42 is best shown in FIG. 6. Hopper frame 42 is formed of metallic tubing or channels to provide sufficient rigidity and support to hopper enclosure 36 which lies atop hopper frame 42. Hopper frame 42 includes a forward section having a pair of mounts 44 for upper and lower longitudinal pivots for brush head 70.

A lift frame 56 that is separate from hopper 34 is provided between hopper 34 and frame 4. As shown in FIG. 6, hopper frame 42, lift frame 56 and the rear of frame 4 all nest together when hopper 34 is in a lower, debris collecting position.

Figure 2:
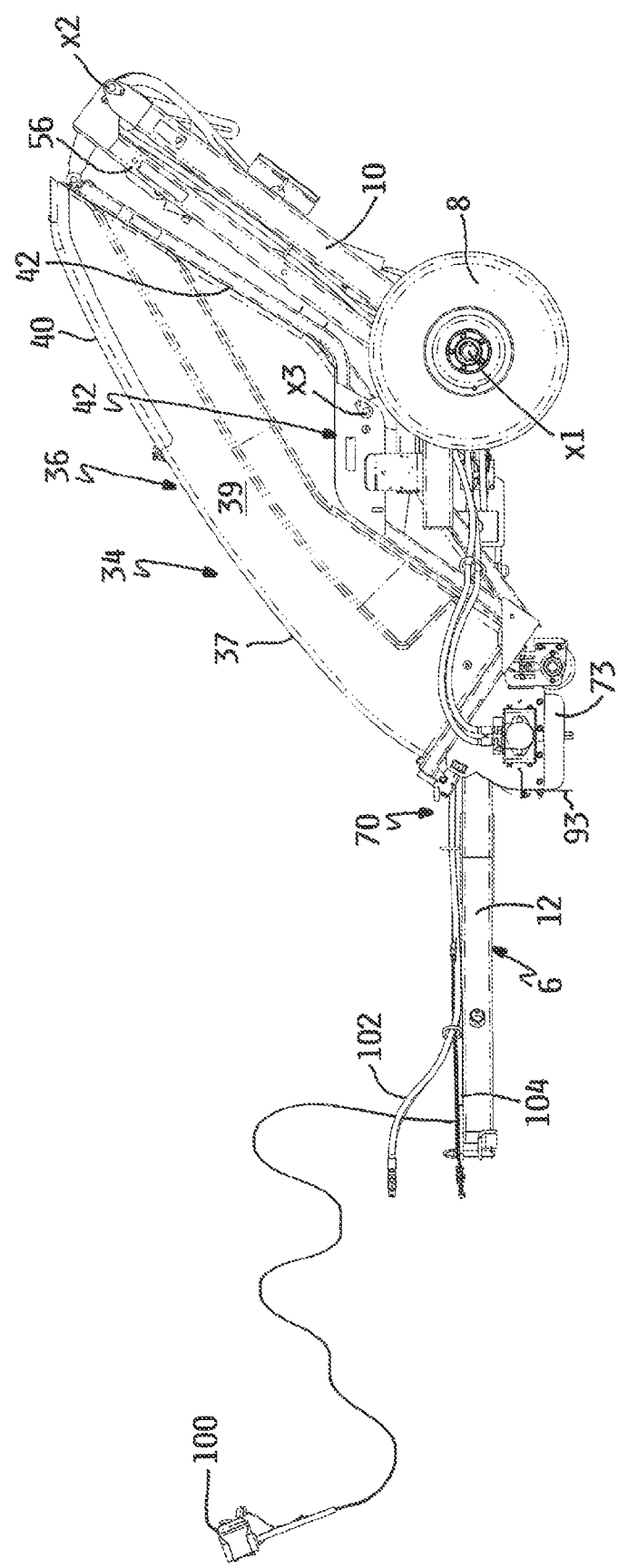
FIG. 2 is a side elevational view of the debris sweeper of FIG. 1.

Lift frame 56 has a pair of vertically extending side posts 58. The upper ends of side posts 58 are pivotally connected to the upper ends of the rear uprights 10 of frame 4. Thus, lift frame 56 can pivot on frame 4 about a substantially horizontal, transverse lift frame pivot axis $x_2$ defined by pivot pins 60. As shown in FIG. 2, lift frame pivot axis $x_2$ is well to the rear of the rotational axis $x_1$ of wheels 8. A lift actuator 62, such as a hydraulic cylinder, is provided on sweeper 2 extending between frame 4 and lift frame 56 for pivoting lift frame 56 about lift frame pivot axis $x_2$ between the lower, debris collecting position and an upper, debris dumping position.

Hopper frame 42 is pivotally connected to lift frame 56 somewhat forwardly of the rotational axis $x_1$ of wheels 8 along a substantially horizontal, transverse hopper axis $x_3$. See FIG. 2. This does two things. First, it transfers the weight of hopper frame 42 and its accumulated contents to frame 4 in a location that maintains positive weight on tongue 6 at all times, even when hopper 34 is fully loaded with relatively heavy debris such as aeration cores. Thus, traction of the tow vehicle will not be degraded by causing tongue 6 to lift. Second, it permits brush head 70, which is carried on the front of hopper frame 42, to pivot back and forth within certain limits about hopper axis $x_3$ to follow fore-and-aft extending hills and depressions in the turf surface.

Figure 3:
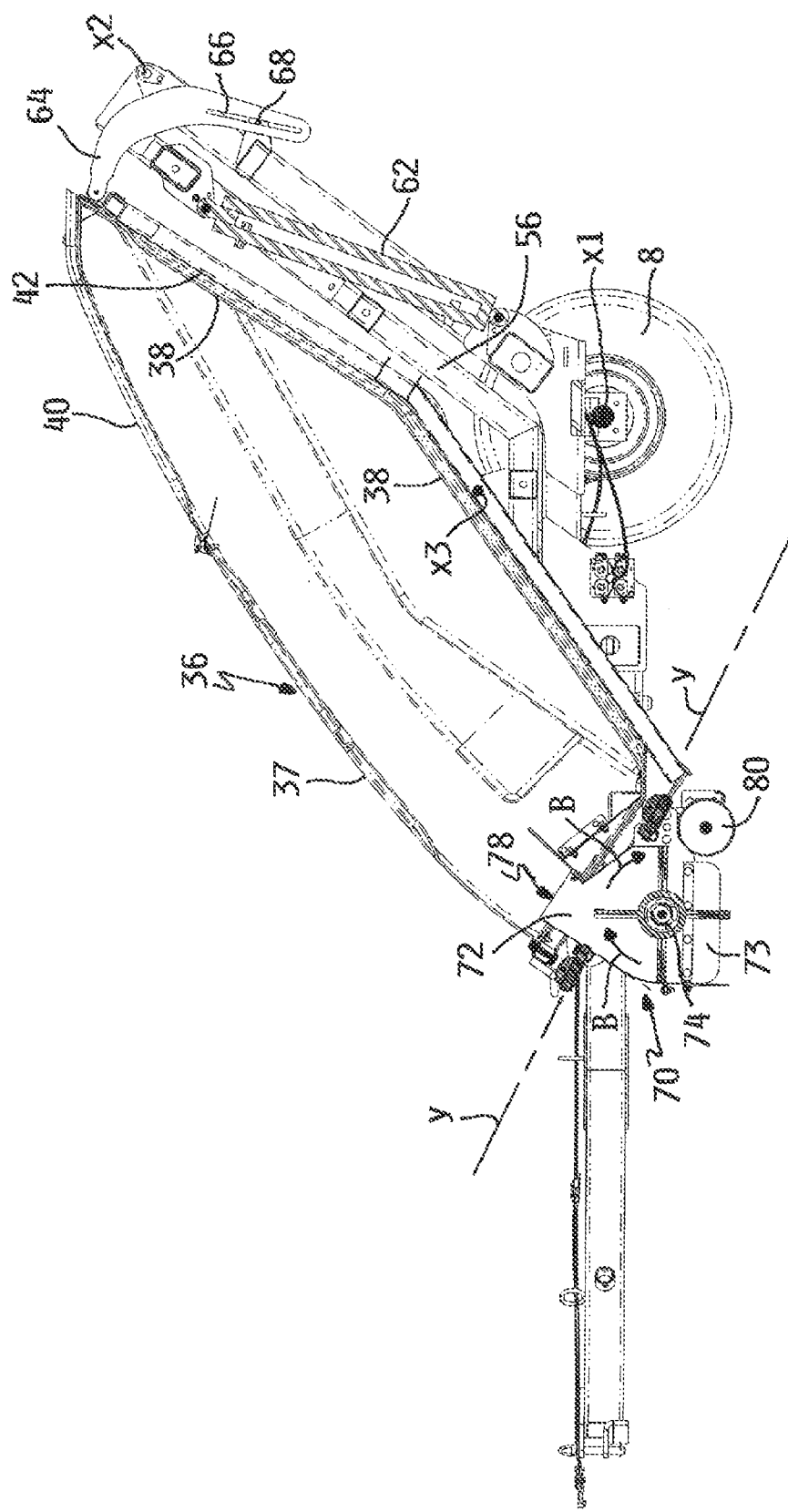
FIG. 3 is a longitudinal cross-sectional view of the debris sweeper of FIG. 1, particularly illustrating the collecting hopper in its lower, debris collecting position.
Figure 4:
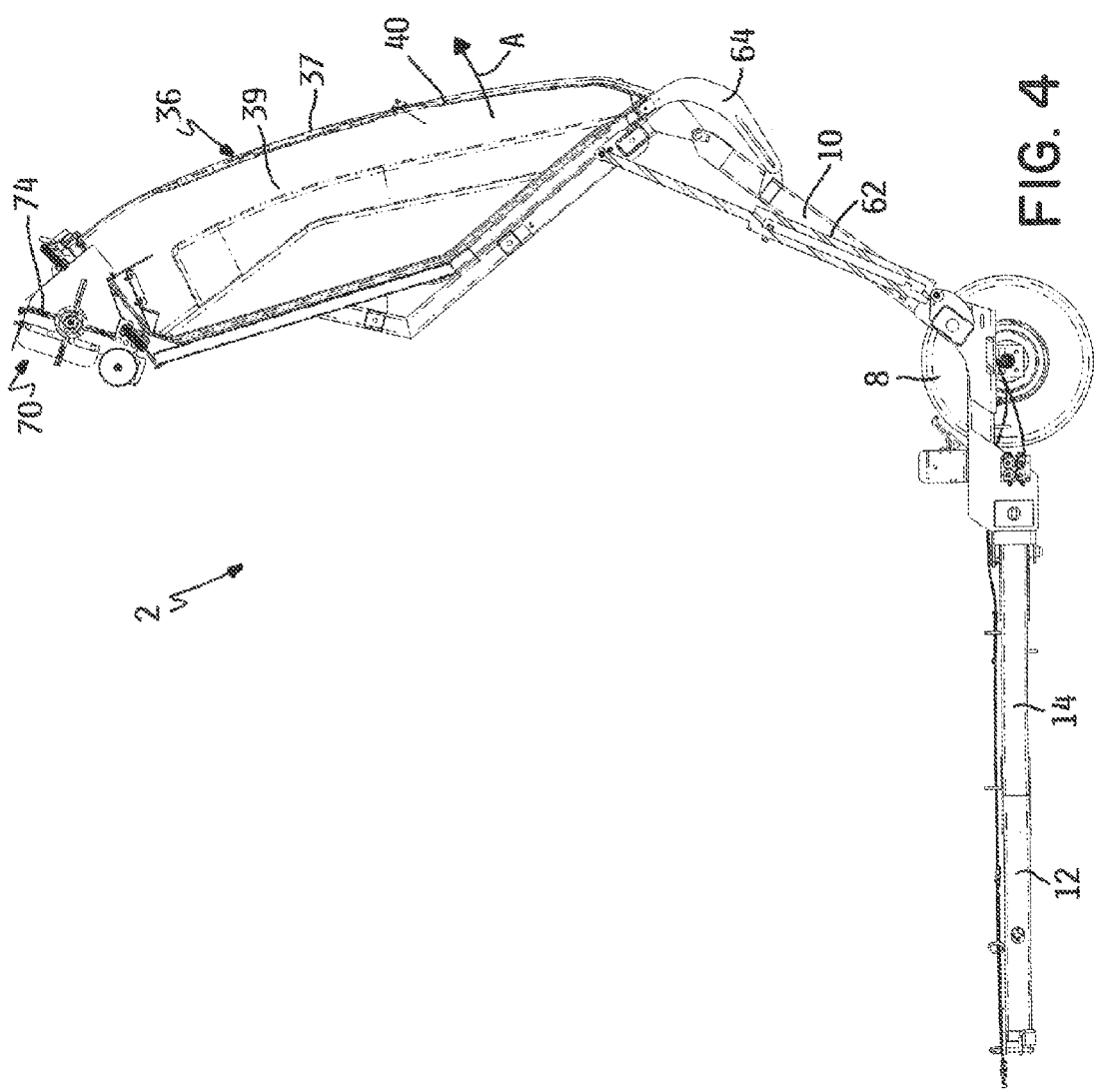
FIG. 4 is a longitudinal cross-sectional view similar to FIG. 3, particularly illustrating the collecting hopper in its upper, debris dumping position.
Figure 5:
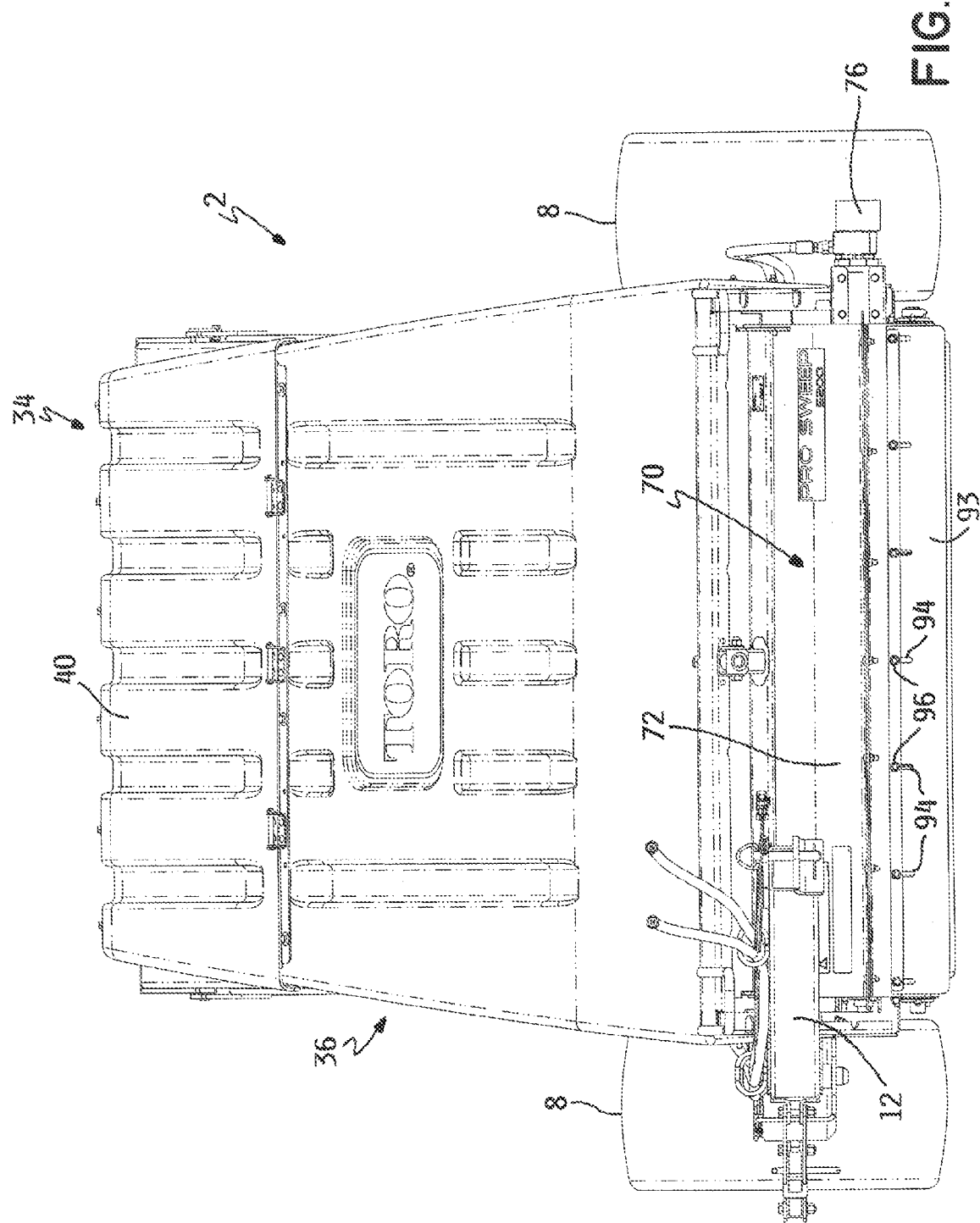
FIG. 5 is a front elevational view of the debris sweeper of FIG. 1.

When lift actuator 62 is extended, lift frame 56 will pivot upwardly about lift frame pivot axis $x_2$ and will carry hopper 34 with it since hopper 34 is pivoted to lift frame 56. A slotted link 64 is provided between the rear upper portion of hopper frame 42 and frame 4 as shown in FIGS. 3, 4 and 6. As lift actuator 62 extends, the lost motion provided by the slot 66 in link 64 will be taken up until a pin 68 on frame 4 reaches the lower end of slot 66. This helps pull or pivot hopper frame 42 over hopper frame pivot axis $x_3$ until hopper frame 42 lies against lift frame 56. When lift actuator 62 reaches full extension, hopper 34 has been raised into its upper dump position and tilted back on lift frame 56 as shown in FIG. 4. The accumulated debris will then act on the pivotal exit door 40 in the top wall of hopper enclosure 36 to pivot exit door 40 in the direction of arrow A to fall out of hopper enclosure 36. Such debris can drop either onto the ground or into the bed of a work or utility vehicle or trailer that has been driven in back of sweeper 2.

Brush Head 70

A brush head 70 is provided on the front of hopper 34. Brush head 70 comprises a housing 72 which includes a transversely extending sweeper brush 74 that rotates about a substantially horizontal axis of rotation. Brush 74 includes one or more flights of brush bristles that are arranged to contact or be closely spaced above the turf surface. A hydraulic motor 76 or the like is provided on the housing to rotate brush 74 such that brush 74 will pick up debris lying on the turf surface and throw such debris up into hopper 34 through an open top exit 78 in housing 72 which mates with the front opening of hopper enclosure 36. Rotation of brush 74 is indicated by the arrows B in FIG. 3.

Housing 72 carries a rear roller 80 for contact with the turf surface. Roller 80 is rotatably carried on a pair of spaced side plates 82 that have height adjusters for changing the vertical location of side plates 82 on each side of housing 72. The height adjusters comprise a plurality of elongated height adjustment slots 84 on side plates 82 that receive a plurality of threaded fasteners 86 on the sides of housing 72. When threaded fasteners 86 are tightened on housing 72, they clamp or hold side plates 82 to housing 72 in a vertically adjusted position. One adjusts the height of housing 72, and thus the height of brush 74, relative to the turf surface by adjusting the position of roller 80 on housing 72. Desirably, the height of housing 72 is adjusted so that the tips of the bristles of brush 74 slightly touch the turf surface One of the height adjustment slots 84 carries at least one set of teeth 88 along an edge thereof for providing adjustment of roller 80 only in discrete increments relative to housing 72. A toothed height adjustment key 90 is provided having a set of matching teeth with the threaded fastener 86 passing through key 90. Thus, if the teeth 88 along the slot and the teeth along the key have a ¼ inch pitch, then roller 80 will be adjusted only in ¼ inch increments. The other non-toothed height adjustment slots 84 are provided for additional force for holding roller 80 in an adjusted position without posing a risk to stripping the teeth from the slot and/or key 90.

The purpose of using incremental height adjusters on each side of roller 80 is to help the operator maintain the bottom of roller 80 parallel to a horizontal reference surface such as the ground. If infinitely adjustable height adjusters were used, it would be difficult if not impossible to tell when roller 80 was adjusted the same amount at each side. One side of roller 80 would likely be higher or lower than the other side such that the corresponding side of brush 74 would be higher or lower than the other side of brush 74. This would result in uneven side-to-side debris pickup by brush 74. However, this result is avoided with the incremental height adjusters disclosed herein as the toothed keys 90 and cooperating toothed slots 84 will maintain parallelism of brush 74 with the ground as long as such keys 90 engage in corresponding teeth in the toothed height adjustment slots provided on side plates 82. Indicia (not shown) can be provided on side plates 82 adjacent the toothed slots 84 to further aid the operator in ensuring that keys 90 are engaged with the same teeth 88 in each slot.

Preferably, each side of the toothed slot 84, and each side of key 90, carries a set of teeth 88 of similar pitch, i.e. ¼ inch pitch as described above. However, teeth 88 on one side of toothed slot 84 and along one side of key 90 are vertically offset relative to teeth 88 on the other side of slot 84 and the other side of key 90 by half the pitch between teeth 88, i.e. with a ¼ inch tooth pitch the amount of the offset will be ⅛ inch. Thus, if key 90 is inverted and used upside down in toothed slot 84, as indicated by a reference tab 92 that sticks out from one side of key 90, another set of incremental adjustments will be provided in between the first set of incremental adjustments. In other words, if the first set of incremental adjustments provides adjustments such as 5.50, 5.75, 6.00, 6.25 inches etc., then the second set of incremental adjustments will be 5.625, 5.875, 6.125, 6.375 inches etc.

A front rubber flap 93 is provided on housing 72. Flap 93 has a lower edge that desirably extends down close to but terminates a small distance above the turf surface. Flap 93 is height adjustable on housing 72 by virtue of a plurality of vertical height adjustment slots 94 on flap 93 which receive a plurality of threaded fasteners 96. Flap 93 can be adjusted such that its lower edge terminates at different distances above the turf surface depending upon the nature of the turf surface and the debris that is being removed therefrom. Raising flap 93 or removing flap 93 entirely may be required when picking up larger debris or if debris is to be picked up from a turf surface having relatively long grass.

In addition, a pair of rubber side flaps 73 are located along each side of housing 72. Preferably, rubber flaps 73 are located immediately adjacent to the ends of sweeper brush 74 such that no cores will be missed by sweeper brush 74 and left in windrows between the ends of sweeper brush 74 and side flaps 73. In fact, to ensure this happens, it is desired that side flaps 73 physically engage against the ends of the sweeper brush 74. Accordingly, the lower ends of each side flap 73, namely those portions of side flap 73 closest the ground, are bent inwardly into engagement with the brush bristles on each end of sweeper brush 74 by inclined backing plates (not shown) that force the lower ends of each side flap 73 laterally inwardly.

Side flaps 73 and front flap 93 are desirably made of rubber, or some other flexible material, since they have lower edges that come close to the ground. Using a flexible material, such as rubber, avoids having flaps 73 and 93 gouge the ground if they should inadvertently contact the ground. However, non-flexible materials could be used in flaps 73 and 93 if so desired.

A pair of longitudinal pivots 97 connect housing 72 of brush head 70 to mounts 44 provided therefor on the forward section of hopper frame 42. Pivots 97 each comprise a pivot housing 98 that is carried between the ears 45 of mounts 44. Each pivot housing 98 has a longitudinal bore that is aligned with the bore in the other pivot housing 98 and that is inclined downwardly from the front to the rear of housing 72. Housing 72 is provided with pivot pins 99 that are received in these aligned bores to pivotally mount brush head 70 to hopper 34 for a rolling motion about the roll axis indicated as y in FIG. 7.

Allowing brush head 70 to roll about longitudinal axis y improves the ground following ability of brush head 70. Brush head 70 is already able to pitch about transverse axis $x_3$ due to the pivotal mounting of hopper 34 on lift frame 56. Brush head 70 can now also roll relative to hopper 34 about roll axis y. This improves the ability of brush head 70 to pick up debris from the turf surface even when the turf surface is contoured both in fore-and-aft as well as side-to-side directions.

The Control Box

A control box 100 is provided for controlling the operation of the powered components of sweeper 2, namely tongue adjuster 30, lift actuator 62, and brush motor 76. Sweeper 2 includes a pair of hydraulic hoses 102 having quick couplers for coupling any hydraulically powered components on sweeper 2, such as lift actuator 62 and brush motor 76, to the hydraulic system of the tow vehicle. In addition, sweeper 2 includes a power wire harness 104 which may be coupled to the battery or some other electrical power source on the tow vehicle for supplying electrical power to any electrically powered components of sweeper 2. Such components include the electrically powered tongue adjuster 30, the solenoid operated valves (not shown) used to open and close the flow of hydraulic fluid to lift actuator 62 and brush motor 76, as well as electrically operated brakes (not shown) for wheels 8 if such brakes are installed.

Figure 12:
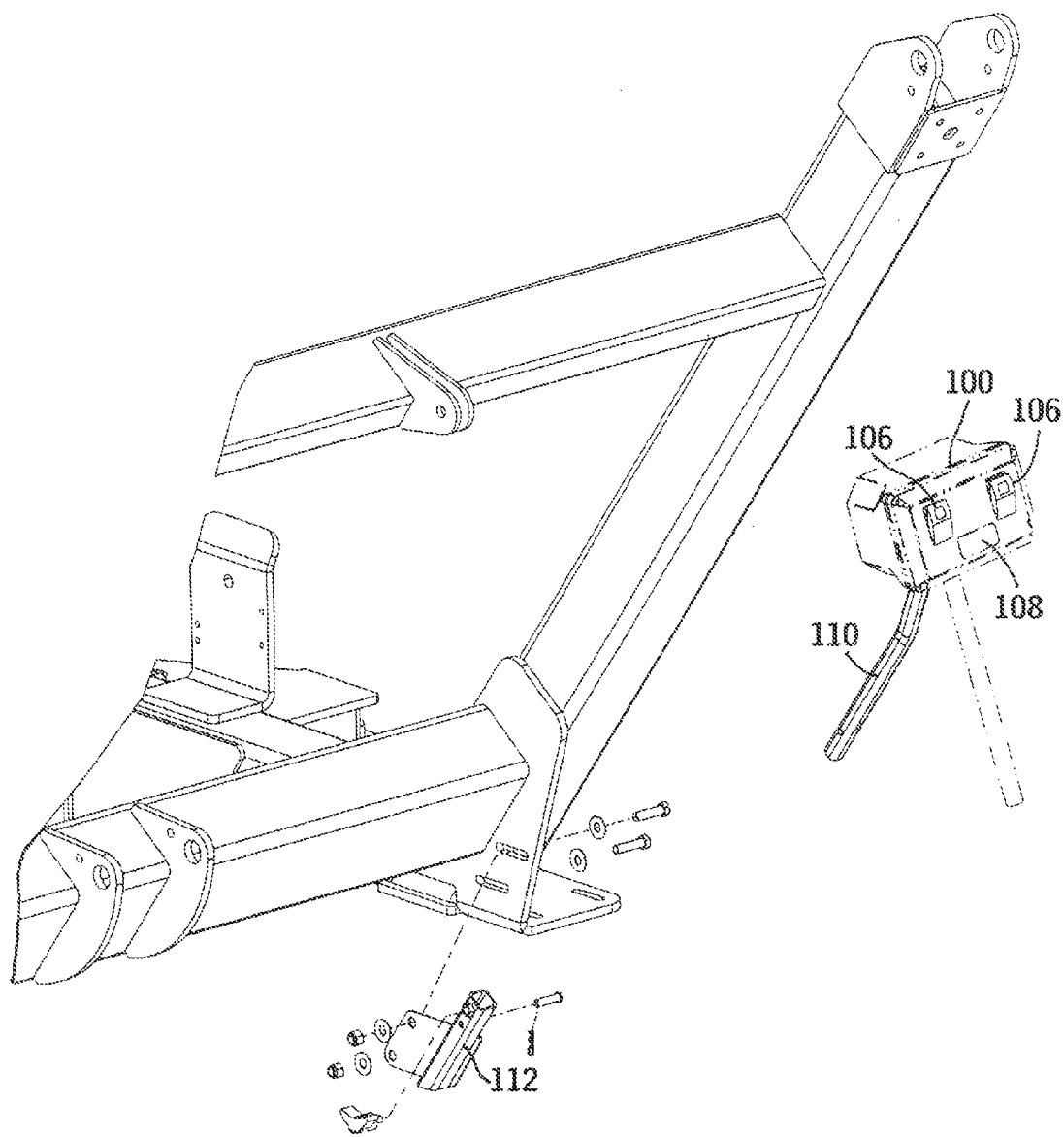
FIG. 12 is a perspective view of a portion of the debris sweeper of FIG. 1, particularly illustrating a bracket on the frame of the debris sweeper for storing a control box used to control various components and operations of the debris sweeper.
Figure 13:
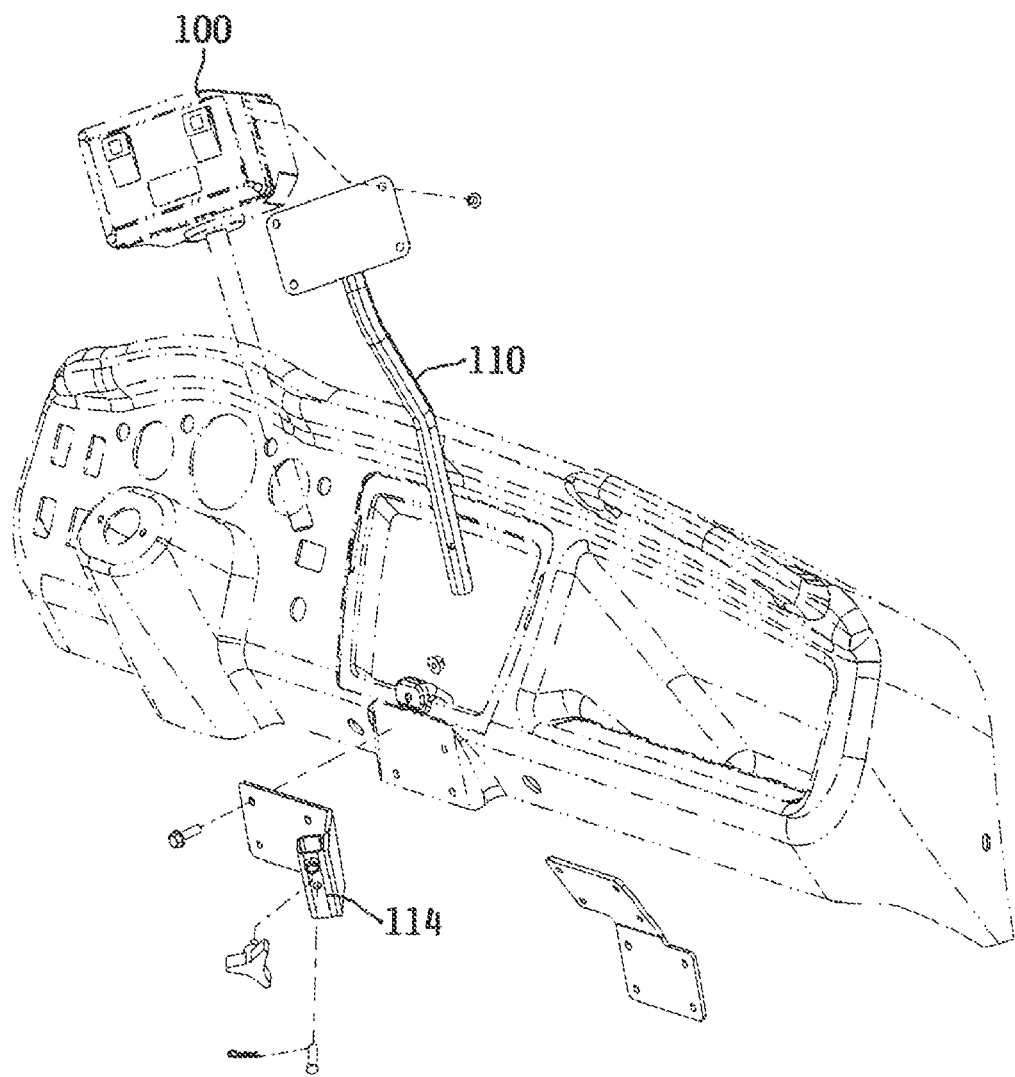
FIG. 13 is a perspective view of a portion of a tow vehicle that may be used to tow the debris sweeper of FIG. 1, particularly illustrating a bracket on the dashboard of the tow vehicle for mounting the debris sweeper control box when the tow vehicle is being used to tow the debris sweeper.

Referring to FIGS. 12 and 13, control box 100 has a pair of vertically oriented rocker switches 106 for controlling the operation of lift actuator 62 and brush motor 76. Toggling switches 106 in an upward direction causes lift actuator 62 to contract and brush motor 76 to rotate, respectively. Toggling switches 106 in a downward direction causes lift actuator 62 to extend and brush motor 76 to stop rotating. A third horizontally oriented toggle switch 108 is on control box 100 to allow the operator to extend and contract piston arm 32 of the tongue adjuster 30 to cause sweeper 2 to trail either directly behind the tow vehicle or to be offset to one side thereof.

Control box 100 is mounted on a post 110. When sweeper 2 is not in operation and is not connected to a tow vehicle, control box post 110 may be slipped into a bracket 112 therefor carried on frame 4 of sweeper 2. This provides a convenient storage position for control box 100 when sweeper 2 is not being used. It also helps protect control box 100 from damage.

When sweeper 2 is in use and is connected to a tow vehicle, control box post 110 may be lifted up and out of bracket 112 on frame 4 of sweeper 2. Preferably, the tow vehicle includes a similar post receiving bracket 114 so that control box post 110 may simply be dropped into bracket 114 on the tow vehicle to locate control box 100 adjacent to and in an upright orientation relative to the operator of the tow vehicle. This allows easy operation of sweeper 2 by the operator of the tow vehicle. The operator can easily change the trailed position of sweeper 2, begin and end a sweeping operation, and selectively empty hopper 34 of accumulated debris, all from the operator's seat on the tow vehicle.

In addition, even if the tow vehicle is not equipped with a similar post receiving bracket 114, perhaps because the tow vehicle is a brand different from that of sweeper 2 itself, most similar tow vehicles in the turf care industry have quick couplers for powering hydraulically powered accessories. It would be simple to connect the hydraulic hoses and the power wire harness of sweeper 2 to the hydraulic system and battery of other tow vehicles. Then, control box 100 could simply lie on the seat of the tow vehicle adjacent the operator to be used from the operator's seat on the tow vehicle. Thus, sweeper 2 is adapted for use with a wide variety of tow vehicles.

Various modifications of this invention will be apparent to those skilled in the art. Thus, this invention will be limited only by the appended claims.

We claim:

1. A debris sweeper for a turf surface, which comprises:
   (a) a tow frame having transport wheels that rotate about a transverse wheel axis of rotation;
   (b) a lift frame connected to the tow frame for pivoting about a transverse lift frame pivot axis such that the lift frame pivots between a lower, debris collecting position and an upper, debris dumping position; and
   (c) a hopper for receiving and holding debris picked up from the turf surface in the lower, debris collecting position of the lift frame and for dumping debris therefrom in the upper, debris dumping position of the lift frame, wherein the hopper is pivotally connected to the lift frame for pivoting about a transverse hopper pivot axis that is separate and distinct from the lift frame pivot axis with the separate hopper pivot axis permitting the hopper to pivot independently from the lift frame at least when the lift frame is in the lower, debris collecting position thereof.

2. The debris sweeper of claim 1, wherein the lift frame pivot axis is located rearwardly of the wheel axis and the hopper pivot axis is located forwardly of the wheel axis.

3. The debris sweeper of claim 1, wherein the lift frame pivot axis is located both rearwardly and upwardly from the wheel axis.

4. The debris sweeper of claim 1, further including a sweeper brush for sweeping debris from the turf surface into the hopper.

5. The debris sweeper of claim 4, wherein the sweeper brush is powered by a motor.

6. The debris sweeper of claim 5, wherein the sweeper brush comprises a rotary brush extending transversely relative to the tow frame.

7. The debris sweeper of claim 4, wherein the sweeper brush is carried in a housing that is mounted to pivot about a longitudinal roll axis to allow the sweeper brush to follow side-to-side variations in ground contour.

8. The debris sweeper of claim 7, wherein the housing is also mounted to pivot about a transverse pitch axis to allow the sweeper brush to follow fore-and-aft variations in ground contour.

9. The debris sweeper of claim 8, wherein the sweeper brush is carried on the hopper such that the transverse pitch axis of the sweeper brush is the hopper pivot axis.

10. A debris sweeper for a turf surface, which comprises:
    (a) a tow frame having transport wheels that rotate about a transverse wheel axis of rotation;
    (b) a lift frame connected to the tow frame for pivoting about a transverse lift frame pivot axis such that the lift frame pivots between a lower, debris collecting position and an upper, debris dumping position; and
    (c) a hopper for receiving and holding debris picked up from the turf surface in the lower, debris collecting position of the lift frame and for dumping debris therefrom in the upper, debris dumping position of the lift frame, wherein the hopper is connected to the lift frame for pivoting about a transverse hopper pivot axis; and
    (d) further including a link extending between the hopper and the tow frame, the link having a lost motion connection that is configured to pull the hopper rearwardly about the hopper pivot axis to abut the hopper with the lift frame at some point in the movement of the lift frame between its lower and upper positions.

11. A debris sweeper for a turf surface, which comprises:
    (a) a wheeled tow frame;
    (b) a hopper connected to the tow frame for holding and dumping debris picked up from the turf surface; and
    (c) a motor powered sweeper carried on the hopper for sweeping debris from the turf surface into the hopper, wherein the sweeper is mounted to pivot relative to the tow frame about a longitudinal roll axis to allow the sweeper to follow side-to-side variations in ground contour, wherein the sweeper is also mounted to pivot relative to the tow frame about a transverse pitch axis to allow the sweeper to follow fore-and-aft variations in ground contour, the transverse pitch axis of the sweeper comprising a transverse hopper pivot axis that allows pivotal motion of the hopper relative to the tow frame.

12. The debris sweeper of claim 11, wherein the hopper also pivots relative to the tow frame about a dump pivot axis that permits the hopper to pivot between a lower, debris collecting position and an upper, debris dumping position.

13. The debris sweeper of claim 12, wherein the hopper pivot axis and the dump pivot axis are two different axes.

14. The debris sweeper of claim 13, wherein the hopper pivot axis and the dump pivot axis are located on opposite sides of an axis of rotation of a pair of wheels carried on the tow frame.

15. The debris sweeper of claim 11, wherein the sweeper is carried in a housing, and further including a toothed height adjuster on each side of the housing for adjusting the height of the housing above a reference plane in a first set of predetermined increments.

16. The debris sweeper of claim 15, wherein the toothed height adjusters are configured to adjust the height of the housing above the reference plane in a second set of predetermined increments that are located midway between the increments in the first set.

17. A debris sweeper for a turf surface, which comprises:
    (a) a tow frame having a forwardly extending hitch tongue and transport wheels that rotate about a transverse wheel axis of rotation that is located behind the hitch tongue;
    (b) a lift frame to which a debris collecting hopper is coupled, the lift frame and the hopper coupled thereto being movable on the tow frame between a lower, debris collecting position and an upper, debris dumping position;

(c) a powered rotary brush for sweeping debris from a turf surface into the debris collecting hopper;

(d) the lift frame being pivotally coupled to the tow frame for pivotal movement between the lower, debris collecting position and the upper, debris dumping position about a dump pivot axis that is adjacent an upper rear end of the tow frame and that is behind the wheel axis; and (e) the hopper being pivotally coupled to the lift frame for pivotal movement about a hopper pivot axis, wherein the hopper pivot axis in the lower, debris collecting position of the lift frame and the hopper is located at a position ahead of the wheel axis such that the weight of the hopper and any debris collected in the hopper is borne by the tow frame ahead of the wheel axis to maintain positive downforce on the hitch tongue even when the hopper is substantially fully loaded with debris.

* * * * *